(12) United States Patent
Burdis et al.

(10) Patent No.: US 9,013,778 B2
(45) Date of Patent: Apr. 21, 2015

(54) LASER CUTS TO REDUCE ELECTRICAL LEAKAGE

(71) Applicant: SAGE Electrochromics, Inc., Faribault, MN (US)

(72) Inventors: Mark Samuel Burdis, Faribault, MN (US); Jean-Christophe Giron, Edina, MN (US); Harvey Kalweit, Faribault, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 151 days.

(21) Appl. No.: 13/786,934

(22) Filed: Mar. 6, 2013

(65) Prior Publication Data

US 2014/0253996 A1 Sep. 11, 2014

(51) Int. Cl.
*G02F 1/15* (2006.01)
*G02F 1/155* (2006.01)
*G02F 1/153* (2006.01)

(52) U.S. Cl.
CPC ........ *G02F 1/155* (2013.01); *G02F 2001/1536* (2013.01); *G02F 2001/1552* (2013.01); *G02F 2001/1555* (2013.01)

(58) Field of Classification Search
CPC .......................................... G02F 1/15
USPC ....................................... 359/265
See application file for complete search history.

(56) References Cited

U.S. PATENT DOCUMENTS

| | | | |
|---|---|---|---|
| 5,321,544 A | 6/1994 | Parkhe et al. | |
| 5,370,775 A | 12/1994 | Parkhe | |
| 5,404,244 A | 4/1995 | Van Dine et al. | |
| 5,659,417 A | 8/1997 | Van Dine et al. | |
| 5,699,192 A | 12/1997 | Van Dine et al. | |
| 5,724,175 A * | 3/1998 | Hichwa et al. ................ | 359/265 |
| 5,724,177 A | 3/1998 | Ellis, Jr. et al. | |

(Continued)

FOREIGN PATENT DOCUMENTS

| | | |
|---|---|---|
| WO | 2004068231 A1 | 8/2004 |
| WO | 2012007334 A1 | 1/2012 |
| WO | 2013090209 A1 | 6/2013 |

OTHER PUBLICATIONS

U.S. Appl. No. 13/950,791, filed Jul. 25, 2013.

(Continued)

*Primary Examiner* — James Jones
(74) *Attorney, Agent, or Firm* — Robert N. Young

(57) ABSTRACT

One object of the present invention is to provide an electrochromic device having improved insulating film structure to reduce electrical leakage. The improved structure includes a lower conductive layer, upper conductive layer, an electrochromic electrode layer, a counter electrode layer, and at least one ion-conductor layer sandwiched between the electrochromic electrode layer and the counter electrode layer. The lower conductive layer and the electrochromic electrode layer are scribed and the gap formed from the scribing is filled with the layers formed above the electrochromic electrode layer. In some aspects, the ion-conductor layer is also scribed with the lower conductor and electrochromic electrode layers and the gap formed from the scribing is filled with the layers formed above the ion-conductor layer. In further aspects, the insulating film may include one or more buffer layers formed above an ion-conductor layer, further separating the upper conductive layer from the lower conductive layer.

22 Claims, 3 Drawing Sheets

(56) References Cited

U.S. PATENT DOCUMENTS

| | | |
|---|---|---|
| 7,193,763 B2 * | 3/2007 | Beteille et al. ............ 359/265 |
| 7,372,610 B2 | 5/2008 | Burdis et al. |
| 7,593,154 B2 | 9/2009 | Burdis et al. |
| 7,749,907 B2 | 7/2010 | Miyairi et al. |
| 8,004,744 B2 | 8/2011 | Burdis et al. |
| 8,043,796 B2 | 10/2011 | Akimoto |
| 8,043,969 B2 | 10/2011 | Miyairi et al. |
| 8,148,259 B2 | 4/2012 | Arai et al. |
| 8,391,331 B2 | 3/2013 | Eichberger et al. |
| 2012/0019889 A1 | 1/2012 | Lamine et al. |

OTHER PUBLICATIONS

U.S. Appl. No. 14/095,308, filed Dec. 3, 2013.
International Search Report & Written Opinion for Application No. PCT/US2014/011657 dated Apr. 25, 2014.
International Search Report and Written Opinion for Application No. PCT/US2014/047955 dated Oct. 13, 2014.

* cited by examiner

LASER CUTS TO REDUCE ELECTRICAL LEAKAGE

BACKGROUND OF THE INVENTION

The present invention relates to electrochromic devices and more particularly relates to solid-state, inorganic thin film devices.

Electrochromic materials and devices have been developed as an alternative to passive coating materials for light and heat management in building and vehicle windows. In contrast to passive coating materials, electrochromic devices employ materials capable of reversibly altering their optical properties following electrochemical oxidation and reduction in response to an applied potential. The optical modulation is the result of the simultaneous insertion and extraction of electrons and charge compensating ions in the electrochemical material lattice.

In general, electrochromic devices have a composite structure through which the transmittance of light can be modulated. FIG. 1 illustrates a typical five layer solid-state electrochromic device in cross-section having the five following superimposed layers: an electrochromic electrode layer ("EC") 14 which produces a change in absorption or reflection upon oxidation or reduction; an ion conductor layer ("IC") 13 which functionally replaces an electrolyte, allowing the passage of ions while blocking electronic current; a counter electrode layer ("CE") 12 which serves as a storage layer for ions when the device is in the bleached or clear state; and two transparent conductive layers ("TCLs") 11 and 15 which serve to apply an electrical potential to the electrochromic device. Each of the aforementioned layers are typically applied sequentially on a substrate 16. Such devices typically suffer from intrinsic electronic leakage (between the electrochromic stack layers) and electronic breakdown.

Typically, electrical power is distributed to the electrochromic device through busbars. FIG. 2 illustrates the electrochromic device of FIG. 1, in cross-section, having power supplied from two conductive elements, such as busbars 18 and 19. In order to prevent the busbars from shorting together, the busbars are electrically isolated from one another. Conventionally, this is done by scribing the TCLs 11 and 15. As shown in FIG. 2, the first (lower) TCL 15 is scribed at point P1, making the lower TCL 15 a discontinuous layer, and thereby preventing the busbars from shorting across the lower TCL 15. Similarly, the second (upper) TCL 11 is scribed at point P3, making the upper TCL 11 also discontinuous, and thereby preventing the busbars from being shorted together across the upper TCL 11.

In order to produce electrochromic devices in a more cost effective manner, it is necessary to modify the deposition process to provide for higher yields and to be more amenable to mass production. In general, the yield can be considered to be reduced every time a substrate or other workpiece is cycled between vacuum and atmosphere and vice versa. This is because dust and debris from the coating process—which is inevitably present in sputtering—is 'blown' around during venting and pumpdown, and can find its way onto the active layers, leading to defects in the film structure. Ideally, all the layers could be deposited in one single continuous vacuum step, i.e., one coating machine. However, depositing all the layers in a single vacuum step, would require including a laser scribe (or cut of some type) between the deposition of the lower transparent conductor and the deposition of the second transparent conductor in a vacuum system. Such cutting processes are very difficult in a vacuum system. For instance, with regard to laser scribing, it is necessary to maintain an extremely tight focus for the laser. Such focus is very difficult to achieve efficiently with the mechanical tolerances present in the system.

Furthermore, in order for a solid state electrochromic device to function correctly, it is necessary to block electric current from passing between the busbars of the electrochromic device directly, other than through the desired electrochromic mechanism. Any electronic current that leaks or passes through either of the conductive layers serves to short out the required voltage and inhibits the flow of ions through the electrochromic device. As such, leakage current due to intrinsic electronic leakage leads to compromises in device performance including a lowered dynamic range, non-uniform coloration, decreased ionic conductance, slower switching rates, and increased power consumption. Merely increasing the thickness of the ion conductor layer may result in a reduction of leakage current, but at the expense of degraded optical properties, increased layer deposition time and cost, and reduced switching rates. Accordingly, it is desirable to reduce the amount of electronic leakage through an electrochromic device without resorting to a thick ion conductor layer so as to avoid these compromises in performance.

BRIEF SUMMARY OF THE INVENTION

One aspect of the disclosure provides an electrochromic device including a discontinuous upper conductive layer, and a discontinuous lower conductive layer. A first portion of the upper conductive layer may be coupled to a first conductive element. A second portion, discontinuous from the first portion, of the upper conductive layer may be coupled to a second conductive element. A first portion of the lower conductive layer may be coupled to the first conductive element. A second portion, discontinuous from the first portion, of the lower conductive layer may be coupled to the second conductive element.

The electrochromic device may further include a first electrode layer comprising one of a counter electrode layer and an electrochromic electrode layer, between the upper conductive layer and the lower conductive layer, a discontinuous second electrode layer comprising the other of the counter electrode layer and the electrochromic electrode layer, between the upper conductive layer and the lower conductive layer, and a continuous ion-conductor layer for conducting ions between and in communication with the first electrode layer and the second electrode layer. The first electrode layer may be in contact with each of the first portion and the second portion of the upper conductive layer. The first portion of the second electrode layer may be in contact with the first portion of said lower conductive layer, and a second portion, discontinuous from the first portion, of the second electrode layer may be in contact with the second portion of the lower conductive layer. The ion-conductor layer may be in contact with each of the first portion and said second portion of the second electrode layer.

In some aspects, at least a portion of the first portion of the upper conductive layer may be disposed above at least a portion of the second portion of the lower conductive layer. Each of the discontinuous lower conductive layer and the discontinuous second electrode layer may include a gap, the respective gaps of the discontinuous lower conductive layer and the discontinuous second electrode layer may be adjacent to one another. At least a portion of the continuous ion-conductor layer may occupy each of the respective gaps. The respective gaps may be filled by the electrochromic device layers formed above the second electrode layer.

In some aspects, the electrochromic device may further include at least one continuous buffer layer between the second electrode layer and the ion-conductor layer. The buffer layer may include at least one of $WO_2$, $NiO$, $CeO_2$, $MoO_2$, and $V_2O_5$, and may be adapted to allow for passage of ions between the second electrode layer and the first electrode layer.

In some aspects, the continuous ion-conductor layer may have a thickness between about 1 nm and about 70 nm. In further aspects, each of the one or more buffer layers may have a thickness between about 10 nm and about 300 nm. In yet further aspects, the upper and lower conductive layers may be separated by at least about 170 nm.

Another aspect of the disclosure provides for an electrochromic device including a discontinuous upper conductive layer, a first portion of the upper conductive layer being coupled to a first conductive element and a second portion, discontinuous from the first portion, of the upper conductive layer being coupled to a second conductive element. The electrochromic device may further include a discontinuous lower conductive layer, a first portion of the lower conductive layer being coupled to the first conductive element and a second portion, discontinuous from the first portion, of the lower conductive layer being coupled to the second conductive element. The electrochromic device may further include a first electrode layer comprising one of a counter electrode layer and an electrochromic electrode layer, between the first conductive layer and the second conductive layer. The first electrode layer may be in contact with each of the first portion and the second portion of the upper conductive layer. The electrochromic device may yet further include a discontinuous second electrode layer comprising the other of the counter electrode layer and the electrochromic electrode layer, between the upper conductive layer and the lower conductive layer. A first portion of the second electrode layer may be in contact with the first portion of the lower conductive layer. A second portion, discontinuous from the first portion, of the second electrode layer may be in contact with the second portion of the lower conductive layer. The electrochromic device may even further include a discontinuous ion-conductor layer for conducting ions between and in communication with the second electrode layer and the first electrode layer. A first portion of the ion-conductor layer may be in contact with the first portion of the second electrode layer.

In some aspects, the electrochromic device may further include a continuous ion-conductor layer for conducting ions between and in communication with the second electrode layer and the first electrode layer. The ion-conductor layer may be in continuous contact with the first electrode layer.

In further aspects, at least a portion of the second portion of the upper conductive layer may be disposed above at least a portion of the first portion of the lower conductive layer. Each of the discontinuous first conductive layer, the discontinuous second electrode layer, and the discontinuous ion-conductor layer may include a gap. The respective gaps of those layers may be aligned with one another such that the respective gaps form a single gap. At least a portion of the continuous ion-conductor layer may occupy a portion of the single gap. The single gap may be filled by the electrochromic device layers formed above the discontinuous ion-conductor layer.

In some aspects, the electrochromic device may further include at least one continuous buffer layer between the continuous and discontinuous ion-conductor layers. The buffer layer may be in continuous contact with the continuous ion-conductor layer. The buffer layer may include at least one of $WO_2$, $NiO$, $CeO_2$, $MoO_3$, and $V_2O_5$, and may be adapted to allow for passage of ions between the second electrode layer and the first electrode layer.

In some aspects, the buffer layer may have a thickness between about 30 nm and 150 nm. In further aspects, the continuous ion-conductor layer may have a thickness between about 20 nm and about 60 nm, or between about 32 nm and about 48 nm. In yet further aspects, the upper and lower conductive layers may be separated by at least about 170 nm.

DETAILED DESCRIPTION

One object of the present invention is to provide an electrochromic device having improved insulating film structure to reduce electronic leakage. The improved insulating film structure permits fabrication of multiple electrochromic devices on a single substrate following a deposition process that is more amenable to mass-manufacture and that provides for higher yields. Specifically, the disclosed electrochromic devices are formed using a deposition process having only two coating processes with a single laser processing step between them (and all remaining laser scribing processing steps performed subsequent to the deposition process). The disclosed devices and processes therefore involve minimal vacuum cycling, thereby increasing yield. These and other objectives are realized by means of an electrochromic device utilizing an electrochromic layer that is scribed along with the lower transparent conductor layer.

Yet another objective of the present invention is to provide a method of preparing an electrochromic device comprising an improved insulating film structure.

Yet another objective of the present invention is to provide a method of preparing an improved insulating film structure for use in electrochromic devices and in other applications requiring ion conductor layers.

Figure 1:
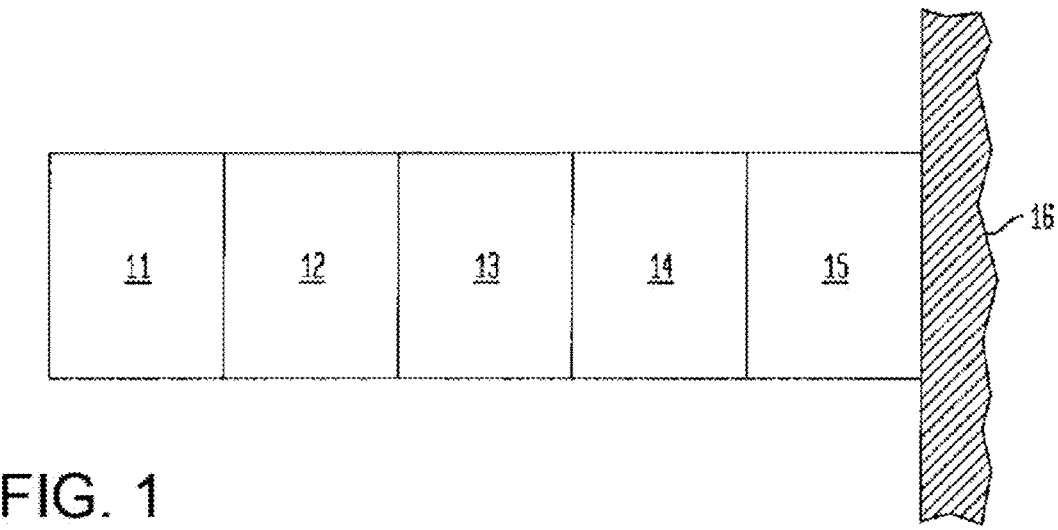
FIG. 1 is a schematic cross-section of a typical electrochromic device
Figure 2:
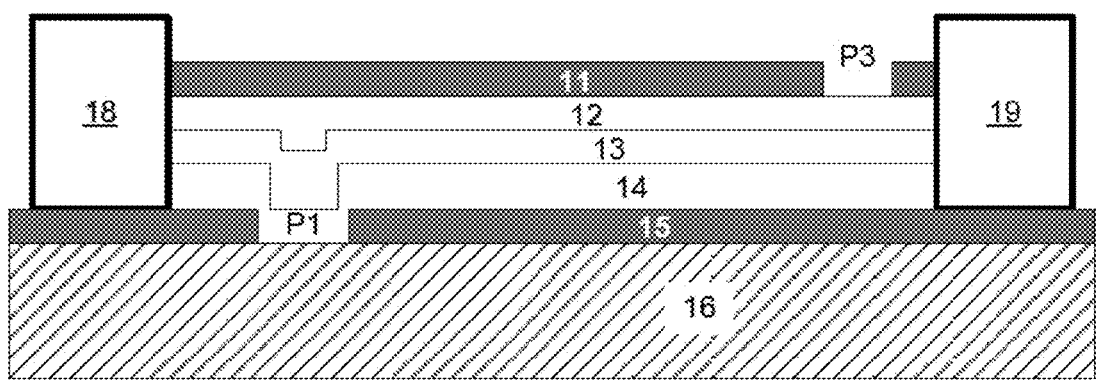
FIG. 2 is another schematic cross-section of a typical electrochromic device.
Figure 3:
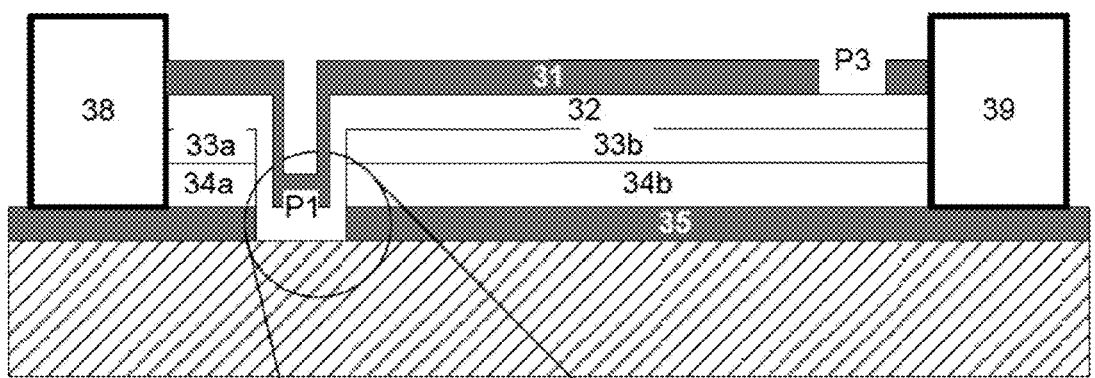
FIG. 3 is a schematic cross-section of an electrochromic device having an improved structure in accordance with one embodiment of the current invention.

In accordance with the present invention, FIG. 3 illustrates a solid-state electrochromic device 30, in cross-section, having an improved insulating film structure. The device of FIG. 3 is similar to the solid-state device depicted in FIGS. 1 and 2 to the extent that each of the aforementioned layers is present in the device of FIG. 3. The device of FIG. 3 differs from the device depicted in FIGS. 1 and 2 to the extent that EC layer 34a/34b and IC layer 33a/33b of the device of FIG. 3 do not extend continuously from the first busbar 38 to the second busbar 39. Rather, a left portion 34a of the EC layer is separated from a right portion 34b. Similarly, a left portion 33a of the IC layer is separated from a right portion 33b. The left and right portions, respectively, are separated by a P1 scribe positioned at location P1 of the device. The P1 scribe may be accomplished using one of several different methods, including laser scribing, etching, mechanical abrading or other suitable removing processes known in the art ("cutting"). The cutting may be performed through the deposited layers to form an aperture or cutaway portion extending from the first busbar to the second busbar, so as to form an isolated layer region extending from the side of the first busbar and which is isolated from the remainder of the layer, which is extended from the side of the second busbar. The formation of the cutaway portions exposes the substrate and provides that additional layers of the electrochromic device may be subsequently formed and be disposed between each of the isolated layer regions.

The cutting may be performed in a variety of different ways and/or methods, such as by use of a suitable masking, scribing or etching processes that utilize one or more of a laser, a mechanical abrasion process involving, for example, use of a diamond, ruby or stainless steel tip, electrical discharge machining, or chemical etching.

In some embodiments, the cutting may be performed prior to the deposition of an ion conductor layer. In these embodiments, the cutting divides only the lower conductive layer and the first electrode, but not the ion conductor layer, into two distinct regions. The timing of the cutting does not affect the manner in which the cut may be performed. Accordingly, in any of the embodiments described herein, the cutting may be performed in the same manner as described above.

Returning to the device 30 of FIG. 3, a CE layer 32 is formed on top of the IC layer 33a/33b and fills, either fully or partially, the gap between the left and right portions of the IC layer 33, EC layer 34, and lower TC layer 35. An upper TCL layer 35 is formed on top of the CE layer 34. The upper TCL layer 35 may further fill, either fully or partially, any remaining portion of the gap not filled by the CE layer 34. Lastly, as described with regard to FIG. 2, the upper TCL layer is scribed at location P3 to prevent the busbars 38 and 39 from shorting. The P3 scribe may be accomplished using any of the scribing techniques described above.

Separation of the left and right portions of each of the IC layer 33a/33b, the EC layer 34a/34b, and the lower TC layer 35, effectively provides for a higher yield during the fabrication of electrochromic devices on a single substrate than is provided by the conventional placement of the P1 laser cut depicted in FIG. 2. In turn, the electrochromic stack configuration of FIG. 3 provides for a more amenable process for mass producing electrochromic devices.

The thickness of the various layers of the electrochromic device of FIG. 3 may vary depending on the electrochromically active materials that are chosen. In some examples, the TC layers may each have a thickness ranging from about 5 nm to about 10,000 nm. Preferably, the TC layers have a thickness in the range of about 10 nm to about 1,000 nm. However, any thickness of the conductive layer may be used provided that such thickness provides adequate conductance for the electrochromic device and does not interfere with the transmission of light through the device.

In some examples, the EC layer may have a thickness of between about 50 nm and about 2000 nm, preferably between about 340 nm and about 420 nm. In some examples, the IC layer may have a thickness between about 1 nm and about 70 nm, preferably between about 20 nm and about 60 nm, and most preferably between about 32 nm and about 48 nm. In some examples, the CE layer may have a thickness ranging from about 50 nm to about 650 nm. In one particular example, the CE layer may be between about 150 nm and about 250 nm thick, preferably between about 175 nm and about 205 nm thick.

The arrangement depicted in FIG. 3, however, yields other concerns related to performance of the electrochromic device 30. In order to achieve peak performance of the electrochromic device 30, the voltage potential difference generated between the busbars 38 and 39 should be maximized. However, leakage current between the busbars can lower the voltage (or potential difference) and thereby reduce the performance of the device. For example, at the circled portion of FIG. 3, which is shown enlarged and in greater detail, the flow of leakage current along vector 37 from the upper TC layer 31 to the lower TC layer 35 is shown. In configurations such as the example of FIG. 3, leakage current 37 may be significant due to the proximity of the upper and lower TC layers 35 and 31. Because the performance of EC devices relies on there being a sufficient separation (or electronic isolation) of the upper TC layer from the lower TC layer to minimize leakage current between the two layers, the device 30 may perform poorly. In order for the device 30 in the example of FIG. 3 to perform properly, the CE layer 34 must provide a sufficient separation (or electronic isolation) between the upper and lower TC layers 35 and 31. As described above, in some examples, the CE layer may have a thickness of as little as about 50 nm, which may not be sufficient to separate between the upper and lower TC layers 35 and 31.

Figure 4:
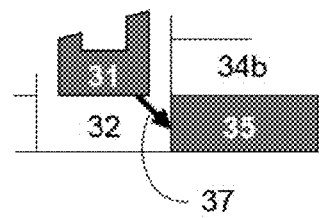
FIG. 4 is a schematic cross-section of an electrochromic device having an improved structure in accordance with another embodiment of the current invention.
Figure 4:
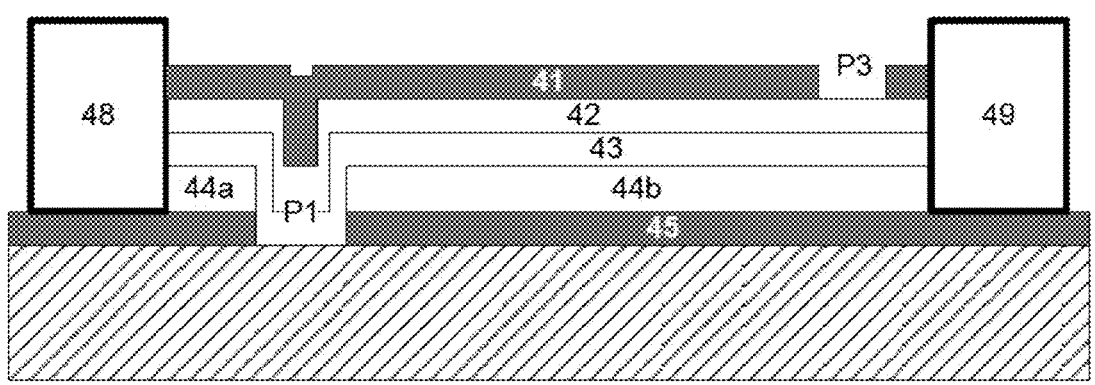

In accordance with the present invention, FIG. 4 illustrates another solid-state electrochromic device 40, in cross-section, having an insulating film structure further improved upon the structure of the device of FIG. 3. The device of FIG. 4 is similar to the solid-state device depicted in each of FIGS. 1-3 to the extent that each of the aforementioned layers is again present (i.e., layers 41-45, corresponding to layers 11-15 of FIG. 1 and layers 31-35 of FIG. 3). The device of FIG. 4 differs from that of FIG. 1 to the extent that the EC layer 44a/44b of the device of FIG. 4 does not extend continuously from the first busbar 48 to the second busbar 49. The device of FIG. 4 differs from that of FIG. 3 to the extent that the IC layer 43 of the device of FIG. 4 does extend from the first busbar 48 to the second busbar 49. Furthermore, the IC layer 43 fills, either fully or partially, the gap between the left and right portions of the EC layer 44a/44b and the lower TC layer 45a/45b. The CE layer 42, which is formed above the IC layer 43 and extends from the left busbar 48 to the right busbar 49, may further fill, fully or partially, the portion of the gap not filled by the IC layer 43. The upper TC layer 41, which is formed above the CE layer 42 and is scribed at location P3, may even further fill, fully or partially, the portion of the gap not filled by either the IC layer 43 or the CE layer 42.

In the configuration illustrated by FIG. 4, the upper and lower TC layers 41 and 45 are separated at location P1 by not only the IC layer 43 but also the CE layer 42. The separation may range from a thickness of about 51 nm to about 720 nm, preferably between about 170 nm and 310 nm. Particularly, in some examples, the IC layer 43 may provide an additional separation between the TC layers 41 and 45 of between about 1 nm and 70 nm, preferably between about 20 nm and 60 nm, and most preferably between about 32 nm and 48 nm, as compared to the electrochromic device of FIG. 3. The separation between the TC layers 41 and 45 contributed by the IC layer 43 and the CE layer 42 may minimize the amount of leakage current in the device 40. As such, the device 40 of FIG. 4 may exhibit improved performance over that of the device 30 of FIG. 3, while maintaining the benefits of improved yield.

Figure 5:
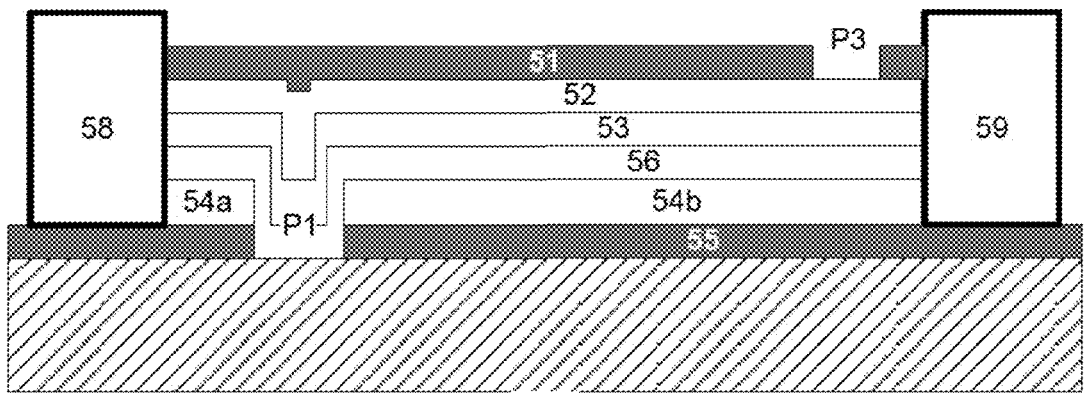
FIG. 5 is a schematic cross-section of another electrochromic device having an improved structure in accordance with yet another embodiment of the current invention.

FIG. 5 illustrates a cross-section of yet another solid-state electrochromic device 50 having an insulating film structure also improved upon the structure of the device of FIG. 3. The device 50 of FIG. 5 is similar to the solid-state devices depicted in each of FIGS. 1-4 to the extent that each of the aforementioned layers is again present (i.e., layers 51-55, corresponding to layers 11-15, 21-25, 31-35, and 41-45 of FIGS. 1-4, respectively). The device 50 of FIG. 5 differs from those of FIGS. 1-4 to the extent that the device 50 of FIG. 5 includes an additional buffer layer 56 positioned between the EC layer 54 and the IC layer 53. The buffer layer may extend continuously from the first busbar 58 to the second busbar 59, and may fill, fully or partially, the gap formed by the P1 scribe. The IC layer 53 may fully extend from the first busbar 58 to the second busbar 59, and may further fill, fully or partially, the portion of the gap not filled by the buffer layer 56. The CE layer 52, which is formed above the IC layer 53 and extends from the first busbar 58 to the second busbar 59, may even further fill, fully or partially, the portion of the gap not filled by either the buffer layer 56 or the IC layer 53. The upper TC layer 51, which is formed above the CE layer 52 and is scribed at location P3, may yet even further fill, fully or partially, the portion of the gap not filled by either the buffer layer 56, the IC layer 53, or the CE layer 52.

In the example of FIG. 5, only one buffer layer 56 is formed between the EC layer 54 and IC layer 53. In other embodiments, multiple buffer layers may be formed between the EC layer 54 and IC layer 53. In such embodiments, the multiple buffer layers may be separated from one another by an ion transport layer, such as an additional IC layer 53.

Any material may be used as a buffer layer provided it allows for the passage of ions from one ion transport layer to another. In some embodiments, the material comprising the buffer layer has low or no electronic conductivity, but this is not essential. The buffer layers are selected from materials including transparent lithium ion permeable materials and mixed conductors. As used herein, a "mixed conductor" means an ion/electron conductor. In some embodiments, the buffer layer comprises metal oxides including, but not limited to, tungsten oxides, nickel oxides, cerium oxides, molybdenum oxides, vanadium oxides, and mixtures thereof. Specific buffer layer materials include, but are not limited to, $WO_3$, $NiO$, $CeO_2$, $MoO_3$, $V_2O_5$, and mixtures thereof. Specific mixtures which may be utilized include mixtures of NiO and $WO_3$, mixtures of $CeO_2$ and $MoO_3$, mixtures of $CeO_2$ and $V_2O_5$, mixtures of $MoO_3$ and $V_2O_5$, and mixtures of $CeO_2$, $MoO_3$, and $V_2O_5$. If a mixture of any two materials is utilized, the amount of the first material to the amount of the second material ranges from about 30:1 to about 1:30, preferably from about 20:1 to about 1:20.

In other embodiments, the buffer layer comprises a silica-based, an alumina-based, or an alumina-silica-based structure. Other buffer materials particularly adapted for lithium ion transmission are lithium-based ceramic materials including lithium silicates, lithium niobium compounds, lithium aluminum silicates, lithium aluminum borates, lithium borates, lithium silicon oxynitrides, lithium zirconium silicates, lithium niobates, lithium borosilicates, lithium phosphosilicates, lithium nitrides, lithium aluminum fluoride, and other lithium-based ceramic materials, silicas, or silicon oxides.

In preferred embodiments, the buffer layer is selected from the group consisting of tungsten oxide and mixtures of nickel oxide and tungsten oxide.

In those embodiments in which the device includes multiple buffer layers, each buffer layer comprising the ion conductor layer may be comprised of the same material. In other embodiments, however, some of the buffer layers comprising the ion conductor layer may be comprised of one type of material while other buffer layers comprising the same ion conductor layer may be comprised of a different type of material. Indeed, it is possible for each of the buffer layers comprising the ion conductor to be made from different materials.

The thickness of each buffer layer varies depending on the material comprising the layer and the desired properties of the electrochromic electrode layer device. However, each buffer layer typically ranges from about 10 nm to about 300 nm in thickness, preferably from about 30 nm to about 150 nm in thickness. Each buffer layer comprising the ion conductor layer may be about the same thickness or may be of varied thicknesses. It is preferred, however, that the buffer layers be about the same thickness. Moreover, the buffer layers may be of the same or different thicknesses as compared with the ion transport layers.

In addition to the IC layer 53 and CE layer 52, the buffer layer(s) 56 may further separate the upper and lower TC layers 51 and 55 from one another, thereby reducing the amount of leakage current present in the device 50. The total separation may range from a thickness of about 61 nm to about 1,000 nm or more, depending on how many buffer layers are formed. Preferably, the separation ranges from about 180 nm to about 460 nm. Particularly, in some examples, the IC layer 53 and buffer layer 56 may provide an additional separation between the TC layers 51 and 55 of between about 11 nm and about 370 nm, preferably between about 30 nm and 210 nm or more (depending on how many buffer layers are formed) as compared to the electrochromic device 30 of FIG. 3. As such, the device 50 of FIG. 5 may exhibit improved performance over that of the device 30 of FIG. 3, while maintaining the benefits of improved yield.

Figure 6:
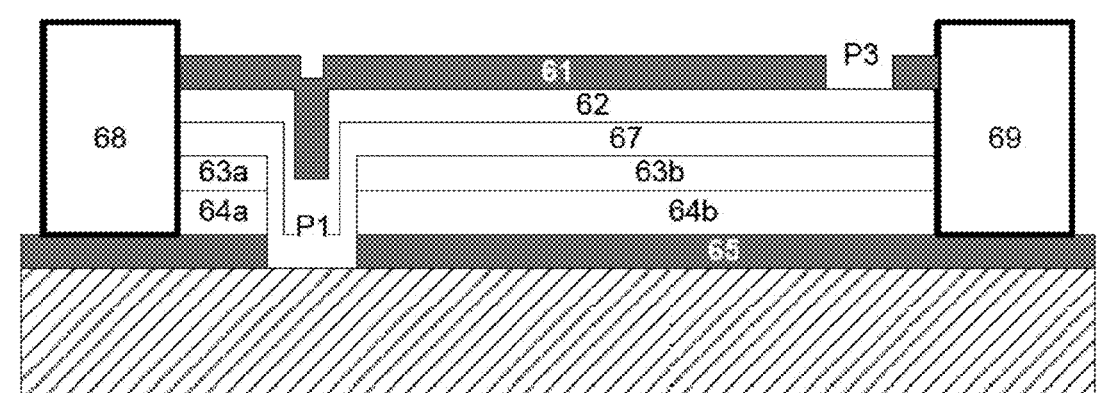
FIG. 6 is a schematic cross-section of another electrochromic device having an improved structure in accordance with yet another embodiment of the current invention.

FIG. 6 illustrates a cross-section of even another solid-state electrochromic device 60 having an insulating film structure also improved upon the structure of the device of FIG. 3. The device 60 of FIG. 6 is similar to the solid-state device depicted in each of FIGS. 1-4 to the extent that each of the aforementioned layers is again present (i.e., layers 61-65, corresponding to layers 11-15, 21-25, 31-35, and 41-45, of FIGS. 1-4, respectively). The device 60 of FIG. 6 differs from those of FIGS. 1-4 to the extent that the device 60 of FIG. 4 includes an additional second IC layer 67 positioned between the first IC layer 63 and the CE layer 62. Unlike the first IC layer 63, which does not extend continuously from the left busbar 68 to the right busbar 69, the second IC layer 67 is not scribed and therefore does extend from the left busbar 68 to the right busbar 69 and may fill, fully or partially, the gap in location P1. The CE layer 62 may fully extend from the left busbar 58 to the right busbar 59, and may further fill, fully or partially, the portion of the gap not filled by the second IC layer 67. The CE layer 62, which is formed above the second IC layer 67 and extends from the left busbar 68 to the right busbar 69, may further fill, fully or partially, the portion of the gap not filled by the second IC layer 67. The upper TC layer 61, which is formed above the CE layer 62 and is scribed at location P3, may yet even further fill, fully or partially, the portion of the gap not filled by either the second IC layer 67 or the CE layer 62.

The materials comprising each of the first IC layer 64 and the second IC layer 67 are selected from insulators. When used in window applications, such as architectural windows, it is preferred that the ion conductor be selected from a transparent insulator. As used herein, "transparent" means that a significant percentage of incident light intensity may be transmitted through a thin film over a wide angular range of incidence. The percentage of transmission of incident light intensity may range from less than about 20% transmittance to greater than about 80% transmittance, depending on the specific application, with the non-transmitted light intensity lost to physical processes including optical absorption, light scattering, and optical reflection. The magnitude of light intensity loss depends upon both the thickness of the insulator material and the insulator material's intrinsic optical properties, including optical absorptivity, the concentration of light absorbing species, the concentration and cross section of light scattering centers, and the refractive index with respect to adjoining materials. It will be appreciated that both the thickness and intrinsic optical properties of the insulator material may be selected to suit certain applications. For example, in architectural window applications, the percent transmission needs to be optimized but not necessarily maximized. In this case, a significant loss of incident light intensity may be desired. On the other hand, in certain electronic display applications, the light scattering and optical absorption of the insulator material may both need to be maximized to provide a substantially opaque backdrop for the reversibly coloring electrochromic material.

Insulators which may be utilized as part of the current invention include, but are not limited to, silicon oxides ($Si_xO_y$), aluminum oxides ($Al_xO_y$), aluminum nitrides ($Al_xO_y$), niobium oxides ($Nb_xO_y$), tantalum oxides ($Ta_xO_y$), titanium oxides ($Ti_xO_y$), zirconium oxides ($Zr_xO_y$), yttrium oxides ($Y_xO_y$), hafnium oxides ($Hf_xO_y$), and mixtures thereof (e.g., $Li_zNb_xO_y$, $La_zTi_xO_y$, $Sr_zZr_xO_y$, etc.), where y equals between 1.5x and 2.5x. Specific insulators which may be utilized include, but are not limited to, $SiO_2$, $Al_2O_3$, $Nb_2O_3$, $Ta_2O_5$, $LiTaO_3$, $LiNbO_3$, $La_2TiO_7$, $La_2TiO_7$, $SrZrO_3$, $ZrO_2$, $Y_2O_3$, $Nb_2O_5$, $La_2Ti_2O_7$, $LaTiO_3$, $HfO_2$ and mixtures thereof. Specific mixtures which may be utilized include mixtures of $SiO_2$ and $Al_2O_3$ and mixtures of $ZrO_2$ and $Y_2O_3$. If a mixture of any two materials is utilized, the amount of the first material to the amount of the second material ranges from about 30:1 to 1:30, preferably from about 20:1 to about 1:20.

In some preferred embodiments of the present invention, the materials comprising the ion transport layers are selected from $SiO_2$, $Al_2O_3$, and $Nb_2O_3$.

In other preferred embodiments, the ion transport layer is a mixture of a silicon oxide and aluminum oxide, wherein the ratio of silicon oxide to aluminum oxide in such a mixture ranges from about 25:1 to about 1:25, preferably the ratio of silicon oxide to aluminum oxide ranges from about 11:1 to about 17:1.

In some embodiments, each IC layer comprising the ion conductor is comprised of the same material. In other embodiments, some of the ion transport layers comprising the ion conductor (or ion conducting layer) may be comprised of one type of material while other ion transport layers comprising the same ion conductor may be comprised of a different type of material. Indeed, it is possible for each of the ion transport layers comprising the ion conductor layer to be made from different materials.

The first IC layer 63 and second IC layer 67 may include the same composition of materials as one another. In another example, the second IC layer may contain different materials from those included in the first IC layer 63, such as any of the materials described above. Additionally, one skilled in the art would appreciate that any of the materials selected for use in the IC layers may be mixed with one or more additives selected from metals, metal oxides, compounds containing metals, molecules, or atomic species to alter the chemical and/or physical properties of one or more ion transport layers.

Each IC layer comprising the ion conductor layer may be about the same thickness or may be of varied thicknesses. It is preferred, however, that each IC layer be about the same thickness.

The presence of two adjacent IC layers in the device 60 may be beneficial for ensuring continuity of the combined IC layer from the left busbar 68 to the right busbar 69. Due to the recess formed by the P1 scribe at location P1 of the device 60, it may be difficult to deposit a single continuous IC layer onto the device 60. In particular, it may be difficult to ensure continuity of the IC layer along the upper portions of the vertical sidewalls formed in location P1. By depositing a first IC layer 63 prior to formation of the recess at location P1, the upper portions of the vertical sidewalls formed in location P1 may be composed of the IC layer material, meaning that the second IC layer need only to abut the upper portions of those sidewalls, but need not form its own continuous layer thereupon.

The arrangement of the device 60 may also be beneficial for further reducing current leakage. For example, the second IC layer 67 may provide additional separation between the upper and lower TC layers 61 and 65, thereby reducing the amount of leakage current capable of passing between the two layers. The separation may range from a thickness of about 51 nm to about 720 nm, preferably from about 170 nm to about 310 nm. Particularly, in some examples, the IC layers 63 and 67 may provide an additional separation between the TC layers 61 and 65 of up to 48 nm, or even up to about 60 nm, or yet even up to about 70 nm, as compared to the electrochromic device of FIG. 3. As such, the device 60 of FIG. 6 may exhibit improved performance over that of the device 30 of FIG. 3.

Figure 7:
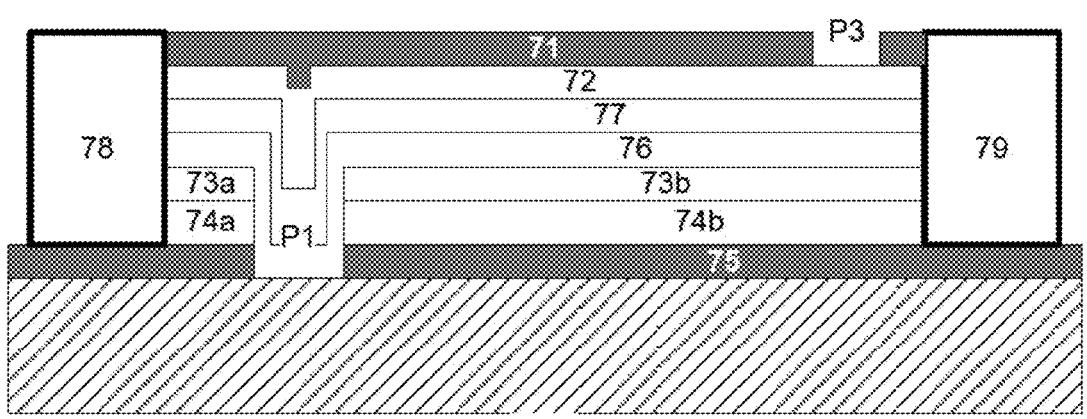
FIG. 7 is a schematic cross-section of another electrochromic device having an improved structure in accordance with yet another embodiment of the current invention.

FIG. 7 illustrates a cross-section of another solid-state electrochromic device 70 having an insulating film structure also improved upon the structure of the device of FIG. 3. The device 70 of FIG. 7 is similar to the solid-state device depicted in each of FIGS. 1-4 to the extent that each of the aforementioned layers is again present (i.e., layers 61-65, corresponding to layers 11-15, 21-25, 31-35, and 41-45, of FIGS. 1-4, respectively). The device 70 of FIG. 7 differs from those of FIGS. 1-4 to the extent that the device 70 of FIG. 7 includes an additional buffer layer 76 positioned above the first IC layer 73. The device 70 of FIG. 7 further differs from those of FIGS. 1-4 to the extent that the device 70 of FIG. 7 includes a second IC layer 76 positioned above the buffer layer 76 and below CE layer 73.

Unlike the first IC layer 63, which does not extend continuously from the left busbar 68 to the right busbar 69, the second IC layer 67 is not scribed and therefore does extend from the left busbar 68 to the right busbar 69 and may fill, fully or partially, the gap formed by the P1 scribe at location P1. The CE layer 62 may fully extend from the left busbar 58 to the right busbar 59, and may further fill, fully or partially, the portion of the gap not filled by the second IC layer 67. The CE layer 62, which is formed above the second IC layer 67 and extends from the left busbar 68 to the right busbar 69, may further fill, fully or partially, the portion of the gap not filled by the second IC layer 67. The upper TC layer 61, which is formed above the CE layer 62 and is scribed at location P3, may yet even further fill, fully or partially, the portion of the gap not filled by either the second IC layer 67 or the CE layer 62.

The arrangement of the device 70 may too be beneficial for reducing leakage current. For example, the buffer layer 76 may provide additional separation between the upper and lower TC layers 61 and 65, thereby reducing the amount of leakage current capable of passing between the two layers. The total separation may range from a thickness of about 61 nm to about 1,000 nm or more, depending on how many buffer layers are formed. Preferably, the separation ranges from about 180 nm to about 460 nm. Particularly, in some examples, the buffer layer 76 and IC layer 77 may provide an additional separation between the TC layers 71 and 75 of between about 11 nm and about 370 nm, preferably between about 30 nm and 210 nm or more (depending on how many buffer layers are formed) as compared to the electrochromic device 30 of FIG. 3. As such, the device 70 of FIG. 7 may exhibit improved performance over that of the device 30 of FIG. 3.

Also provided is a method of fabricating an electrochromic device having an improved yield and increased performance as described herein. The composition or type of layers which are deposited may be varied in order to achieve the desired results without departing from the teachings of the present invention.

Foremost, a lower conductive layer is deposited on a substrate. The lower conductive layer may be deposited by any techniques known in the art including wet chemical methods, chemical vapor deposition, or physical vapor deposition processes. In a preferred embodiment, the materials comprising a conductor layer are deposited via sputtering onto a transparent substrate to form a first transparent conductor layer.

A first electrode, an electrochromic electrode layer, is then deposited on the lower transparent conductor layer through wet chemical methods, chemical vapor deposition, or physical vapor deposition. Preferred methods of deposition include sol-gel, spray pyrolysis, electrodeposition, metallo-organic decomposition, laser ablation, pulsed laser ablation, evaporation, e-beam assisted evaporation, sputtering, intermediate frequency reactive sputtering, RF sputtering, magnetron sputtering, DC sputtering, reactive DC magnetron sputtering and the like.

In preferred embodiments, the first electrode is deposited via intermediate frequency reactive sputtering or DC sputtering techniques. In some embodiments, the first electrode layer is deposited on a heated lower transparent conductor layer.

In some embodiments, an ion conductor layer is then deposited on the first deposited electrode. The ion conductor layer may be deposited by wet chemical methods, chemical vapor deposition or physical vapor deposition. Such methods of deposition include sol-gel, metallo-organic decomposition, laser ablation, evaporation, e-beam assisted evaporation, sputtering, intermediate frequency reactive sputtering, RF sputtering, magnetic sputtering, DC sputtering, and the like.

In some preferred embodiments, the ion conductor layer is deposited by intermediate frequency reactive sputtering or DC sputtering techniques. In other preferred embodiments, the ion conductor layer is deposited by sol-gel thin film deposition techniques including dip coating, spin coating and spray coating. In yet other preferred embodiments, the ion conductor layer is deposited by sputtering or by sol-gel techniques. The procedures for depositing such layers by sputtering or sol-gel coating are known to those skilled in the art.

In some embodiments, buffer layers comprising the ion conductor layer may be deposited on the ion conductor layer. Deposition of buffer layers may include any number of both ion transport and buffer layers provided that: a) the ion transport and buffer layers alternate within the ion conductor layer; b) the layer deposited immediately adjacent to the ion conductor layer is a buffer layer; and c) the layer deposited immediately adjacent to the second deposited electrode, i.e., the counter electrode, is an ion transport layer. The ion transport and buffer layers may be comprised of the materials discussed herein. In preferred embodiments, adjacent ones of the ion transport layers and buffer layer are comprised of different materials.

Each ion transport layer and/or buffer layer may be deposited via the same deposition process or may be deposited via different processes. The individual ion transport and buffer layers may be sequentially deposited by wet chemical methods, chemical vapor deposition or physical vapor deposition. Such methods of deposition include sol-gel, metallo-organic decomposition, laser ablation, evaporation, e-beam assisted evaporation, sputtering, intermediate frequency reactive sputtering, RF sputtering, magnetic sputtering, DC sputtering, and the like.

In some preferred embodiments, the ion transport and buffer layers are each independently deposited by intermediate frequency reactive sputtering or DC sputtering techniques. In other preferred embodiments, the ion transport and buffer layers are each deposited by sol-gel thin film deposition techniques including dip coating, spin coating and spray coating. In yet other preferred embodiments, some of the ion transport layers or buffers are deposited by sputtering while other ion transport or buffer layers are deposited by sol-gel techniques. The procedures for depositing such layers by sputtering or sol-gel coating are known to those skilled in the art.

Each of the layers included in the devices 30, 40, 50, 60, and 70 may be formed using the techniques described in U.S. Pat. No. 8,004,744, the disclosure of which is hereby incorporated by reference herein in its entirety. The layers of the devices may be formed sequentially, beginning with the bottom TCL and working upward to the upper TCL. Cutting at location P1 may be done after all of the cut layers of the respective device are formed over the substrate, but before each of the continuous layers are formed. For example, for the device 30 of FIG. 3, the P1 scribe may be performed after forming the bottom TCL 35, EC layer 34, and IC layer 33, but before forming the CE layer 32 and the upper TCL 31. After forming the upper TCL 31, the cutting at location P3 may be done to the upper TCL 31.

In some embodiments, one or more optical tuning layers may be deposited above the upper TCL. In such embodiments, the P3 laser scribe preferably cuts through both the upper TCL and the optical tuning layers (e.g., after all the layers are deposited).

In each of the above described embodiments, the EC layer is deposited below the IC layer(s) (e.g., closer to the substrate, closer to the lower TCL), and the CE layer is deposited above the IC layer(s) (e.g., closer to the upper TCL). In other embodiments of the disclosure, the placement of the EC and CE layers may be switched, such that the CE layer is positioned below the IC layer(s) and the EC layer is positioned above the IC layers(s). In such embodiments, the P1 laser scribe may cut through the CE layer instead of through the EC layer, and the P3 cut may cut through the transparent conductor layer closer to the EC layer. Similarly, regarding the above described methods, the electrochromic stack may be formed in the reverse order on the substrate. Thus, the bottom two or three formed layers, depending on the embodiment (i.e., the transparent conductor layer adjacent to the substrate, the CE layer, and in some embodiments the IC layer adjacent to the CE layer), may be cut at location P1.

Although each of the above embodiments illustrates an electrochromic structure between only two busbars, it will be understood that the above disclosure similarly applies to devices having more than two busbars as well. In such devices, each of the busbars may be electrically separated from each other by forming the electrochromic structures as described above. Forming of each of the electrochromic structures may be performed simultaneously or sequentially, and the layers formed between each pair of busbars may be scribed in any of the manners described above.

Lastly, the embodiments described above and illustrated in the figures are not limited to rectangular shaped electrochromic devices. Rather, the descriptions and figures are meant only to depict cross-sectional views of an electrochromic device and are not meant to limit the shape of such a device in any manner. For example, the electrochromic device may be formed in shapes other than rectangles (e.g., circles, etc.). For further example, the electrochromic device may be shaped three-dimensionally (e.g., convex, concave, etc.).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An electrochromic device comprising:
   a discontinuous lower conductive layer, a first portion of said lower conductive layer coupled to a first conductive element and a second portion, discontinuous from the first portion, of said lower conductive layer coupled to a second conductive element;
   a discontinuous upper conductive layer, a first portion of said upper conductive layer coupled to the first conductive element and a second portion, discontinuous from the first portion, of said upper conductive layer coupled to the second conductive element, wherein the discontinuous lower conductive layer is between a substrate supporting the electrochromic device and the discontinuous upper conductive layer;
   a first electrode layer comprising one of a counter electrode layer and an electrochromic layer, between said lower conductive layer and said upper conductive layer and in contact with each of the first portion and the second portion of said upper conductive layer;
   a discontinuous second electrode layer comprising the other of the counter electrode layer and the electrochromic electrode layer, between said lower conductive layer and said upper conductive layer, a first portion of said second electrode layer in contact with the first portion of said lower conductive layer, and a second portion, discontinuous from the first portion, of said second electrode layer in contact with the second portion of said lower conductive layer; and
   a continuous ion-conductor layer for conducting ions between and in communication with said first electrode layer and said second electrode layer, the ion-conductor layer being in contact with each of said first portion and said second portion of said second electrode layer.

2. The electrochromic device of claim 1, wherein at least a portion of the first portion of said upper conductive layer is disposed above at least a portion of the second portion of said lower conductive layer.

3. The electrochromic device of claim 1, wherein each of the discontinuous lower conductive layer and the discontinuous second electrode layer includes a gap, the respective gaps of the discontinuous lower conductive layer and the discontinuous second electrode layer being adjacent to one another.

4. The electrochromic device of claim 3, wherein at least a portion of the continuous ion-conductor layer occupies each of the respective gaps.

5. The electrochromic device of claim 3, wherein the respective gaps are filled by the electrochromic device layers formed above the second electrode layer.

6. The electrochromic device of claim 1, further comprising one or more continuous buffer layers between the second electrode layer and the ion-conductor layer.

7. The electrochromic device of claim 6, wherein said buffer layer comprises at least one of $WO_3$, $NiO$, $CeO_2$, $MoO_3$, and $V_2O_5$ and is adapted to allow for passage of ions between the second electrode layer and the first electrode layer.

8. The electrochromic device of claim 1, wherein the continuous ion-conductor layer has a thickness between about 1 nm and about 70 nm.

9. The electrochromic device of claim 6, wherein each of the one or more buffer layers has a thickness between about 10 nm and about 300 nm.

10. The electrochromic device of claim 9, wherein the upper and lower conductive layers are separated by at least about 170 nm.

11. An electrochromic device comprising:
   a discontinuous upper conductive layer, a first portion of said upper conductive layer coupled to a first conductive element and a second portion, discontinuous from the first portion, of said upper conductive layer coupled to a second conductive element;
   a discontinuous lower conductive layer, a first portion of said lower conductive layer coupled to the first conductive element and a second portion, discontinuous from the first portion, of said lower conductive layer coupled to the second conductive element; wherein the discontinuous lower conductive layer is between a substrate supporting the electrochromic device and the discontinuous upper conductive layer;
   a first electrode layer comprising one of an electrochromic electrode layer and a counter electrode layer, between said upper conductive layer and said lower conductive layer and in contact with each of the first portion and the second portion of said upper conductive layer;
   a discontinuous second electrode layer comprising the other of the electrochromic electrode layer and the counter electrode layer, between said upper conductive layer and said lower conductive layer, a first portion of said second electrode layer in contact with the first portion of said lower conductive layer, and a second portion, discontinuous from the first portion, of said second electrode layer in contact with the second portion of said lower conductive layer; and
   a discontinuous ion-conductor layer for conducting ions between and in communication with said second electrode layer and said first electrode layer, a first portion of said ion-conductor layer being in contact with said first portion of said second electrode layer.

12. The electrochromic device of claim 11, wherein at least a portion of the second portion of said upper conductive layer is disposed above at least a portion of the first portion of said lower conductive layer.

13. The electrochromic device of claim 11, further comprising a continuous ion-conductor layer for conducting ions between and in communication with said second electrode layer and said first electrode layer, said ion-conductor layer being in continuous contact with said first electrode layer.

14. The electrochromic device of claim 13, wherein each of the discontinuous lower conductive layer, the discontinuous second electrode layer, and the discontinuous ion-conductor layer includes a gap, the respective gaps of the discontinuous lower conductive layer, the discontinuous second electrode layer, and the discontinuous ion-conductor layer being aligned with one another such that the respective gaps form a single gap.

15. The electrochromic device of claim 14, wherein at least a portion of the continuous ion-conductor layer occupies a portion of the single gap.

16. The electrochromic device of claim 14, wherein the single gap is filled by the electrochromic device layers formed above the discontinuous ion-conductor layer.

17. The electrochromic device of claim 13, further comprising at least one continuous buffer layer between the continuous and discontinuous ion-conductor layer, said buffer layer in continuous contact with continuous ion-conductor layer.

18. The electrochromic device of claim 17, wherein said buffer layer comprises at least one of $WO_3$, NiO, $CeO_2$, $MoO_3$, and $V_2O_5$ and is adapted to allow for passage of ions between the second electrode layer and the first electrode layer.

19. The electrochromic device of claim 17, wherein said buffer layer has a thickness between about 30 nm and 150 nm.

20. The electrochromic device of claim 11, wherein the continuous ion-conductor layer has a thickness between about 20 nm and about 60 nm.

21. The electrochromic device of claim 20, wherein the continuous ion-conductor layer has a thickness between about 32 nm and about 48 nm.

22. The electrochromic device of claim 11, wherein the upper and lower conductive layers are separated by at least about 170 nm.

* * * * *